March 31, 1970 G. W. WIDELL ET AL 3,503,341
COVERED VEHICLE AND COVERED OPERATING MECHANISM THEREFOR
Filed Aug. 31, 1966 5 Sheets-Sheet 2
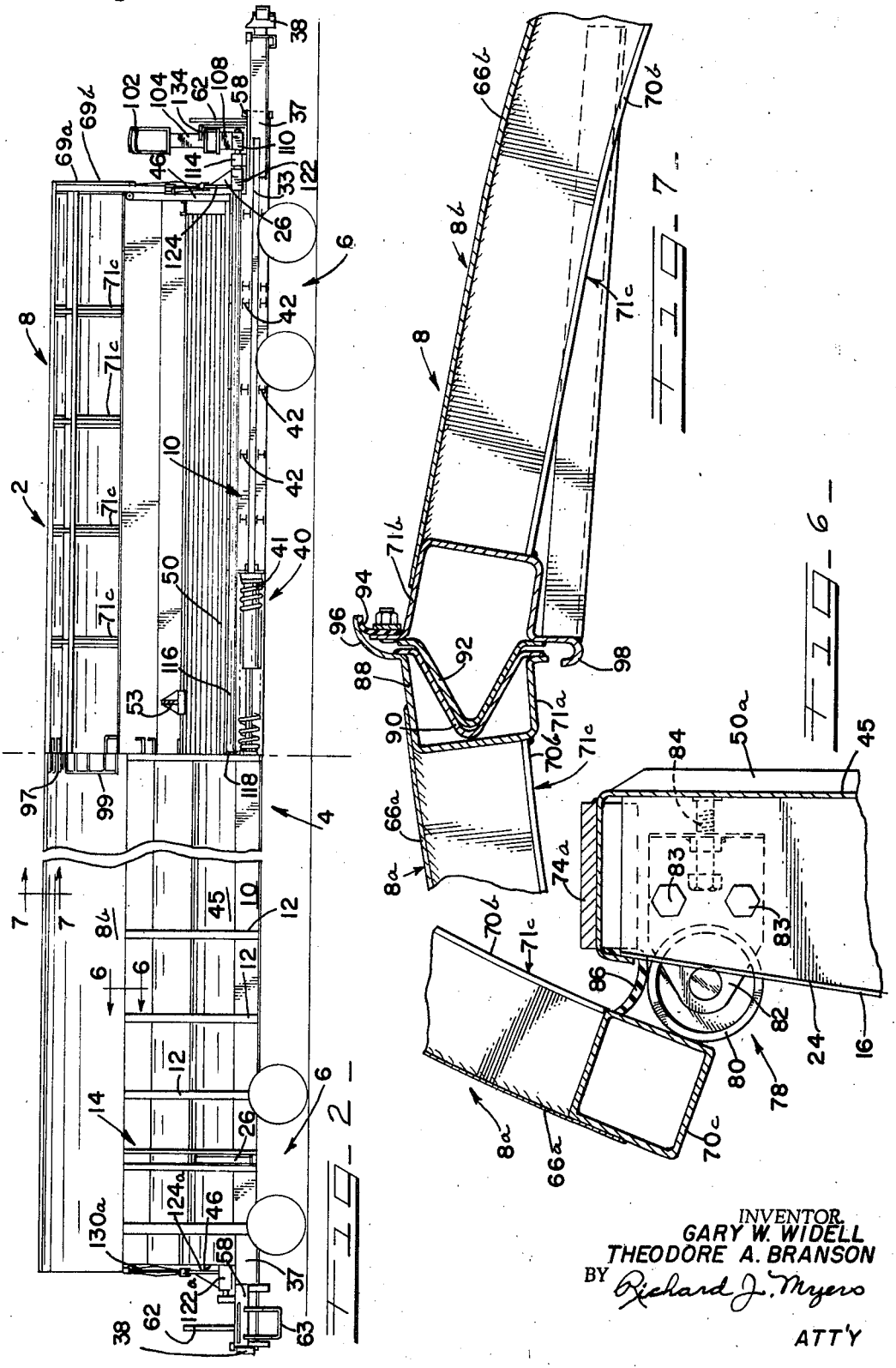
INVENTOR.
GARY W. WIDELL
THEODORE A. BRANSON
BY *Richard J. Myers*
ATT'Y

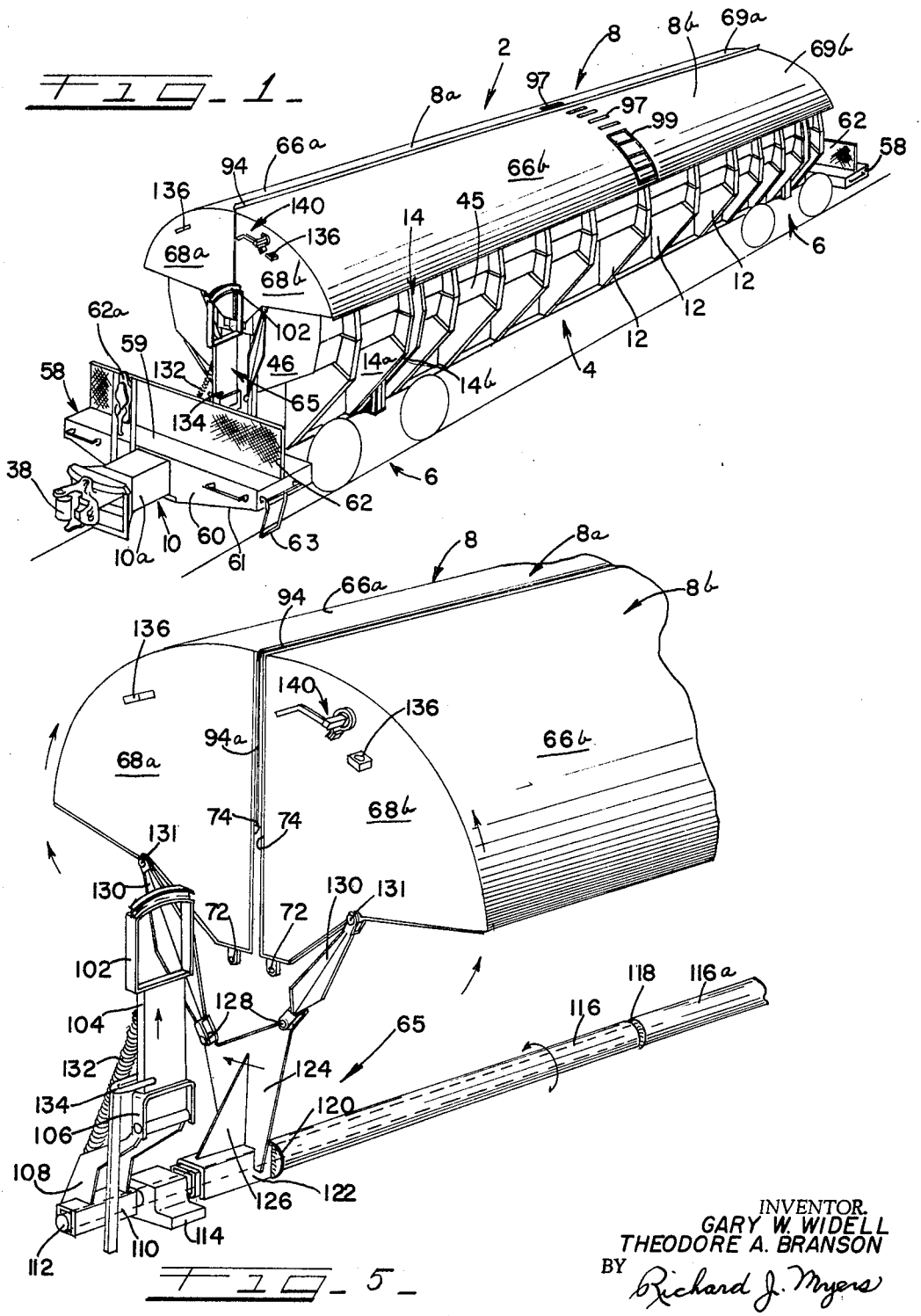

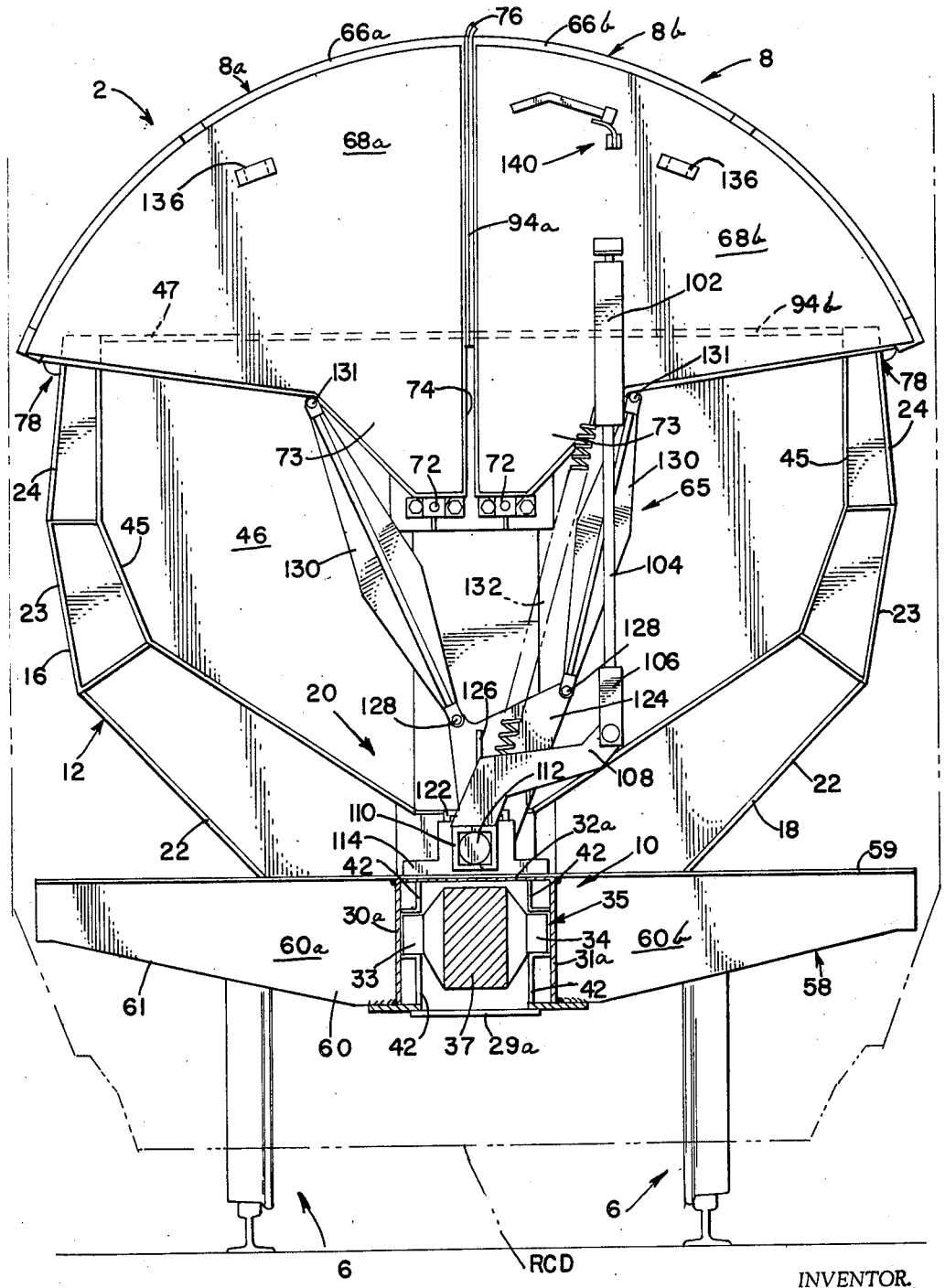

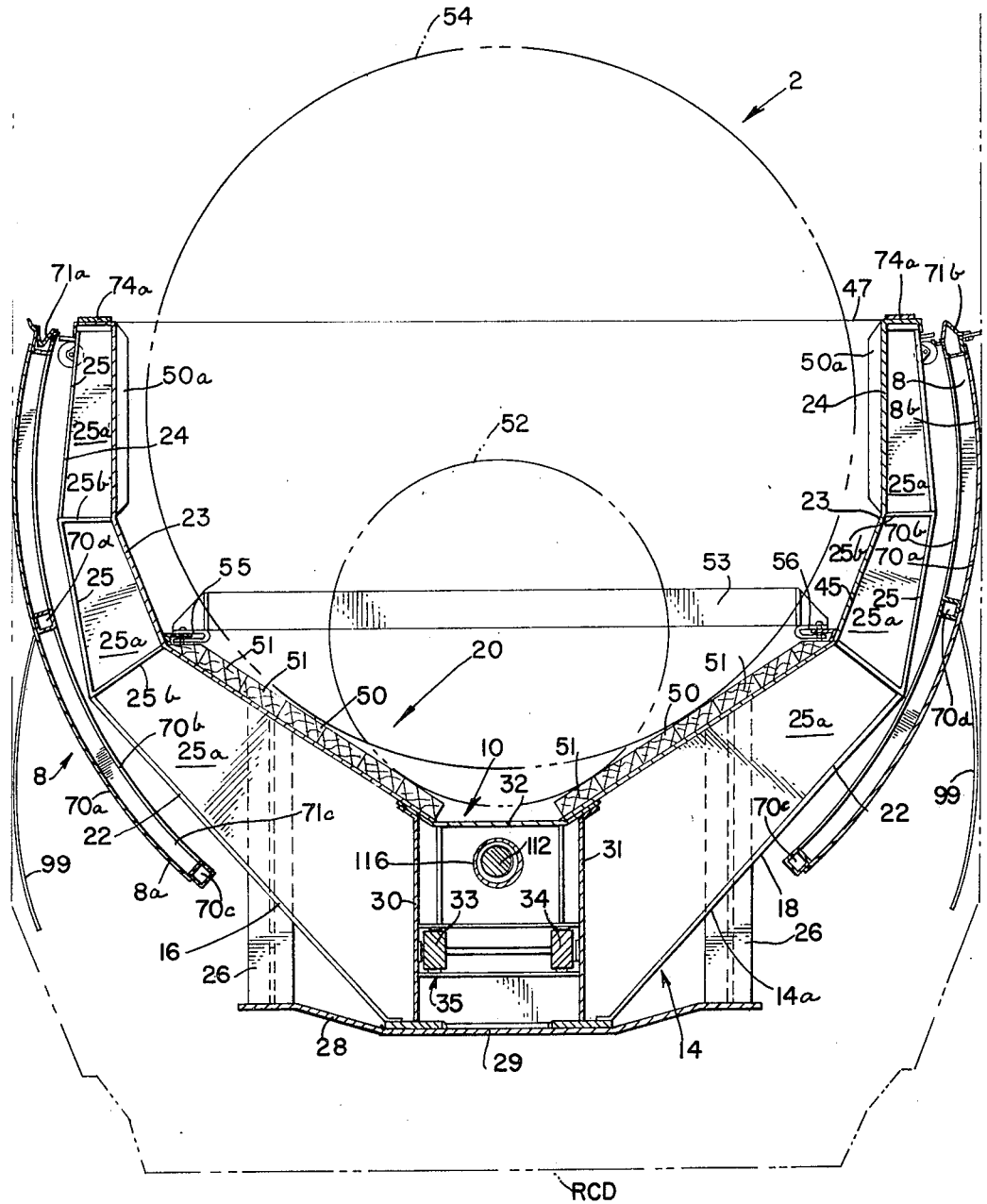

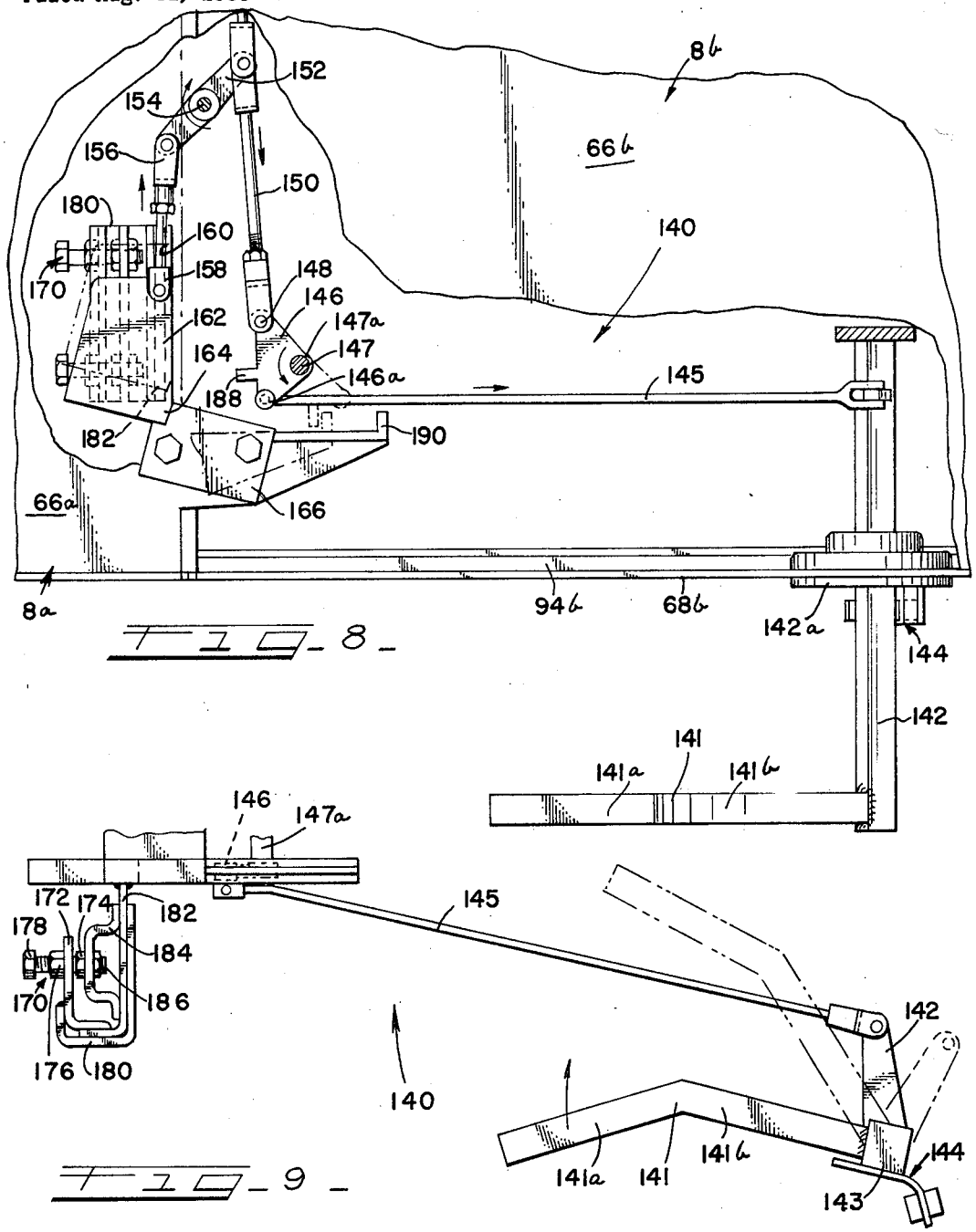

United States Patent Office 3,503,341
Patented Mar. 31, 1970

3,503,341
COVERED VEHICLE AND COVERED OPERATING MECHANISM THEREFOR
Gary W. Widell and Theodore A. Branson, Calumet City, Ill., assignors to Pullman Incorporated, Chicago, Ill., a corporation of Delaware
Filed Aug. 31, 1966, Ser. No. 576,352
Int. Cl. B61d 39/00, 3/16
U.S. Cl. 105—377       19 Claims

ABSTRACT OF THE DISCLOSURE

A covered lading carrying vehicle comprising a longitudinally extending body having a cross section of generally sector-like shape and defining a generally open trough portion for storing lading therein, a pair of longitudinally extending cover sections, each cover section being generally sector-like shaped in cross section and pivotally mounted to the ends of said body and positionable overhead thereof in closing engagement with one another to define at generally enlarged sector-like overhead closure means in forming a generally round-like cross section with the body, and cover operating mechanism mounted on said vehicle and operatively connected with each of the cover sections and the body and operative to move each cover section relative to the other in a generally curved path between a raised closed overhead position and lowered open down position.

---

This invention relates to a covered vehicle and to means for operating the cover of the vehicle, and more in particular relates to a vehicle having a pair of top cover sections for protecting the lading within the vehicle, such as a railroad car.

It is therefore a general object of this invention to provide for a covered vehicle wherein there is provided top cover means comprising a pair of cover sections operable between open and closed positions for protecting the lading within the vehicle, such as a railroad car.

Another object of this invention is to provide for a coil carrying railroad car that is designed to conform for carrying various sized coils and wherein there is provided an overhead cover and sealing arrangement for protecting the coils within the storage compartment of the car.

It is another object of this invention to provide for a cover arrangement for a vehicle which is connected with the vehicle and stays with the vehicle during transport, and therefore does not take up any warehouse or manufacturing plant floor space, the cover arrangement permitting the vehicle to be fully sealed from the weather and yet provide easy accessibility to the lading when required.

Another object of this invention is to provide a cover arrangement comprising a pair of cover sections that are swingable together in an overhead closed position to a lowered open position where each cover section is protected from the lading during loading and unloading and, therefore, is less susceptible to damage.

It is still another object of this invention to provide a vehicle having cross members formed in the shape of a cradle to cooperate with the covering means in protecting the load and which cradling cross members also carry the load.

A further object of this invention is to provide a pair of pivotally connected cover sections for a vehicle in order to properly insulate the contents of the vehicle from the weather and the like wherein the means for swinging the sections in an arcuate path between open and closed positions operates within the Association of American Railroads clearance diagram requirements.

It is a further object of this invention to provide for a coil carrying railroad car capable of carrying various sized coils and which is provided with an integral, swingable overhead cover means which may be easily removed for repair.

These and other objects will become more apparent when referring to the following description, appended claims and attached drawings, wherein:

FIG. 1 is a perspective view of the novel covered vehicle as embodied in a railroad coil car;
FIG. 2 is a side elevational view of said vehicle;
FIG. 3 is an end elevational view of said vehicle showing the operating mechanism for moving, engaging and disengaging the cover sections with one another;
FIG. 4 is a cross sectional view of the vehicle taken at the bolster;
FIG. 5 is a partial perspective view illustrating the operating mechanism for the cover means of the vehicle;
FIG. 6 is a sectional view taken along line 6—6 of FIG. 2;
FIG. 7 is a sectional view taken along line 7—7 of FIG. 2;
FIG. 8 is a partial plan view of a portion of each cover section illustrating the locking mechanism therefor; and,
FIG. 9 is an elevational view of the locking mechanism as shown in FIG. 8.

With reference to the drawings, and in particular to FIGS. 1 through 4, a covered vehicle such as a steel coil carrying railroad car 2 comprises a body portion 4 carried upon the fore and aft trucks 6, 6, and having an overhead cover means 8. The car body portion 4 comprises a center sill structure 10 running longitudinally of the car 2 to which is attached a plurality of longitudinally spaced laterally extending cross members 12, and a pair of longitudinally spaced main cross members or boltster structures 14 disposed over each respective truck 6. Each cross member 12 or 14 comprises a pair of generally curved (actually three straight segments at angles to one another) cradling arm sections 16 and 18, the section 18 being identical to the section 16 except that it opposes the section 16 in mirror image fashion to define longitudinally a coil cradle portion or areaway 20 for each of the cross members 12 or 14. The arm section 16, like the section 18, comprises a lower, deeper section 22, and intermediate section 23, and an outer, upper or terminal section 24, each of the section 22 through 24 being constructed by a flange 25 and a web 25a and a stiffener 25b to define with the side sheet 45 a channel-like part wherein each section 22 to 24 becomes pregressively thinner and tapers upwardly to design a supporting structure for the lading. In the case of the bolster 14, it is designed to provide a pair of longitudinally spaced arm sections 14a and 14b, having portions 22, 23, and 24 like the section 16 but of shorter longitudinal spacing and having between them a further support structure or I beam 26 connecting with plate 28. The fixed center sill 10 and members 29 and 29a extend lengthwise of the car and the sill 10 comprises generally a plurality of plate like members 30, 31 and 32 (FIG. 4); and 30a and 32b (FIG. 3); the sill being narrowed at the car end portions relative to the bolster portions. Inside of this center sill structure 10 there is a sliding or movable ribbon sill construction 35 comprising a pair of steel ribbons 33 and 34, which ribbon sill structure 35 is connected with yokes 37, 37 which carries the couplers 38, 38; the ribbon sill structure, the yoke 37 and the coupler 38 being found at each end of the car and coupled with the cushioning mechanism 40 having a return spring 41. When the coupler 38 is subjected to buff or draft forces, these forces are transmitted through the ribbon sills to the cushion unit where the effect of the force is dissipated and isolated to a great extent from the lading. The ribbon sill is carried by the ribbon sill support and guide elements 42 attached to the fixed center sill structure 10. Each of the arm sections 16 or 18 of the cross members 12, on their inside surfaces carry the longitudinally extending side sheets section 45, which with its opposing sheets section 45 defines the longitudinally extending generally vertical curving sidewalls of the car 2. These sheet sections 45 may be welded together in integrated portions or may be a continuous sheet that is fixedly attached to the stiffeners 25b and webs 25a, of the arm sections 22 through 24. An end sheet 46 is provided at each end of the car 2 and attaches to the outer end of side sheets outwardly of the cross members 12 at each end of the car to form end corners. As seen in dotted line in FIG. 3, there is the top edge 47 of the end sheet 46. Each side sheet section 45 is angulated upwardly in upwardly diverging portions to define the cradle area or portion 20. A pair of laterally opposed outwardly and upwardly sloping wood liner board means 50, 50 extend longitudinally of the car and lie against that portion of a respective sheet 45 supported by the cross arm section 22. Each board means 50 comprises a plurality of wood liner elements 51 (see FIG. 4) upon which rests the lading or steel coil, such as a small coil 52, or a larger coil 54, which is retained by cross bar means 53 to prevent longitudinal movement of the coil. The cross bar means 53 is held to the car by clamping means 55 and 56 at each lateral end which are mounted on board means 50.

The center sills 10 extend beyond each end of the car beyond the end wall sections 46, 46 and supportively carry a platform 58 at each car end which platform consists of a transverse top plate 59 and transverse opposed vertical end plates 60, 60 and bottom plate 61, each vertical plate 60 comprising plate sections 60a and 60b. The center sill section 10 has portion 10a that extends beyond each outer vertical plate 60 of each platform 58 and supportively carries the coupler means 38. Further wood liners 50a are also provided on the inside of each side sheet at portion 24 of each cross member to protect the coil during transit, loading and unloading. Each platform 58 extends transversely of center sill 10 and has mounted thereon a vertical safety guard 62 and a hand brake 62a (on one platform only). A ladder 63 is provided at the left hand platform 58 (see FIG. 2).

The vehicle cover means 8 comprises a pair of overhead cover elements or sections 8a and 8b that extend substantially the length of the car and over the car trough 20, and having rolling or moving engagement with the cross members 12 of the car and are pivotally swingable in an arc from a lowered open and trough uncovering position to a raised closed and trough covering position by means of operating linkage 65. Each cover section 8a or 8b comprises a top or outer arcuately curved shell or element 66a or 66b and a pair of flat quarter-disc shaped end cover plate sections 68a, 69a, or 68b, 69b at each end of the cover 8. As viewed in cross section in FIG. 4, each shell plate unit 66a or 66b comprises a curved sheet or plate 70a attached to longitudinally extending rectangular shaped posts or lower and intermediate tubes 70c and 70d, and a gathering wall divider section or upper tubular member 71a on cover 8a and a gathering wall divider section or upper tubular member 71b on cover section 8b. As seen in FIG. 3, each cover plate section 8a and 8b is pivotally attached to a respective end sheet section 46 by respective pivot means 72, and to the operating linkage 65, which in turn is mounted on the car.

The upper tubular member 71b for the one cover section 8b in cross section is in the form of a projection, while the other tubular member 71a in cross section is in the form of a recessed part to provide for coupling or gathering together of each cover section 8c at its top portion to provide a sealed cover arrangement over the top of the vehicle (see FIG. 7). Each cover section is also provided with a plurality of vertically extending longitudinally spaced hat sections 71c for reinforcing each cover section construction. Each roller 80 rides along a respective hat section 71c, the central part or crown 70b of the hat section extending inwardly of the respective cover section to provide for a rolling surface for the roller 80 (see FIG. 6). Each hat section and each longitudinally extending tubular member 70c, 70d, 71a and 71b is covered by the exterior sheet portion 70a of its respective cover section.

Each pivot means 72 mounts the lower depending section 73 of end section 68a or 68b at each end of the car to generally the central portion of each end sheet 46 to allow each half cover section 8a and/or 8b to fall in an arcuate path about the respective arm sections 16 or 18 whereby the vertical inner edge 74 of each section 68a or 68b and gathering tubes 71a and 71b in their lowered position are below the top or upper extremity 74a (see FIG. 4) of each arm 16 or 18 or each edge 47 of each end sheet 46 so that when the lading is placed in the cradle it cannot hit the edges 74 or the longitudinal tubes 71a and 71b of the sections 8a and 8b because these parts 74 and 71a and 71b are below the arm sections 16 or 18 and are protected thereby as the lading travels over the arm sections and the side sheets 45. Each cover section is supported in an arcuate path along a respective arm section 16 or 18 by roller means 78 mounted on the upper exterior side of a respective arm section 16 or 18 (see FIG. 6).

The roller means 78 comprises the roller 80, a roller mounting bracket 82, which carries the roller 80 and is attached by bolts 83 and is provided with a lateral roller adjustment mechanism 84 for moving over the roller 80 for engagement with the hat section surface 70b of the cover sections 66a or 66b, a roller means 78 being provided for each upper arm section 24 of each cradle arm 16 or 18. Cooperating sealing means 86 are attached to the side sheet sections 45 above a respective roller 80 and extend in a continuous length, the longitudinal extent of the cover sections 66a and 66b for sealing engagement therewith in aid of preventing moisture, water, or other harmful matter from getting into the trough portion of the car in the closing position of the cover means. The inner end portion of the cover section 66a meets with the inner end portion of the cover section 66b, as shown by FIG. 7, wherein the cover sheet section 66a has the inverted or V-shaped tubular reinforcing section 71a defined by a rectangular three sided or U-shaped flange 88 which cooperates with inverted V-flange section 90 attached thereto to define a socket portion for receiving protruding V-shaped flange portion 92 of complementary gathering part 71b, which also has a rectilinear or U-shaped flange fastened to the V-shaped wedge gathering part 92, and is provided with a seal 94 bolted to an end flange portion thereof to provide a sealing relation between the gathering portion 71a and the gathering portion 71b with the end of the seal 94 engaging the integral cup structure 96 of the flange 88. There are vertical end seal means 94a at each cover end parts 68a and 68b for the sealing thereof and transverse horizontally extending car end seals 94b (see FIG. 8) between the end of the car and the ends of the car cover which, with seal means 86 and further seal means provided in each corner of the car between end sheets 45 and 46 and the cover plate section 66a, 66b and each part 68a and 68b, present a cover arrangement that is fully sealed on the car so that little if any moisture is allowed into the car trough area 20. The lower J-shaped flange portion 98 of the element 71b defines a transverse trough 100 extending transversely of the cover and outwardly thereof to drain any water, moisture or other particles that may pass between the seal 94 and the part 96. When the cover sections 8a and 8b are in the closed position the gathering portions 71a and 71b of each thereof provide a tight seal longitudinally of the car through the medium of the elements 96, and seal 94 and the member 71b that extend longitudinally of the coil car cover. Each cover section is provided with recessed foot holes 97 and a depending and downward swingable ladder means 99 in order to climb into the trough section 20 when the cover half sections 8a and 8b are in the down or lower open hatch position.

The cover operating mechanism 65 comprises a lifting eye 102, as seen in FIGS. 1, 2, 3 and 5. The lifting eye 102 is connected to a longitudinally extending leg 104 which has a pivot portion 106 pivotally connected to the bell crank structure 108 which is rigidly connected to square tube 110 which rigidly carries a shaft 112 mounted in pillow block journal 114 which extends lengthwise of the coil car approximately half the length of the car to the center portion thereof where it is rigidly connected to an annular circumscribing tube 116 as by welding at 118 to equalize torsional deflection. The circular drive tube 116 extends back toward the lifting eye 102 and has a square tube adapter 120 sealed to it and carrying the square tube 122 which is rigidly attached to transverse plate 124 supported by web 126, the upper ends of the plate 124 at their transverse outer ends thereby being provided with pivot means 128 for pivotal connection of the arms (cruciform in shape) 130, 130 with the pivot plate or bell crank 124 and the pivot means 131 of the cover sections 68a and 68b, the pivot means 131, 131 being outwardly and above pivot means 72 (see FIG. 3). A spring 132 connects between the top deck 59 of the platform and the lower part of the lifting eye 102 to urge the lifting eye against cross bar 134 (see FIG. 2) to hold the lifting eye 102 in an upright position when it is not being pulled or lifted by a crane. A circular tubular section 116a extends from the juncture 118 and the tubular 116 to the other end of the car where the tubular section 116a connects with a square tube section 122a (see FIG. 2) connecting with bell crank on 124a which pivotally connects with link arms 130a, 130a which pivotally connects with the end sections 69a and 69b of the covers 66a and 66b to cooperate with the bell crank 124 and links 130, 130 upon and for lifting of the lifting eye 102 by a suitable crane means, thereby closing the cover sections 8a, 8b together in the sealed overhead position as seen in FIG. 5. Should it be desired to remove the cover sections, suitable lifting blocks 136 are suitably angularly positioned on the end sections 68a, 68b, 69a, 69b of each cover section 8a and 8b for removing of the cover sections 8a, 8b from the car 2. The cover sections 8a, 8b may be released from their upright closed position, as shown in FIG. 5, by lowering of the crane and allowing the cover sections to swing downward approximately 85 degrees in an arc (with bell cranks 124 and 124a moving down in approximately a 70 degree arc) to an open down position as shown in FIG. 4, through pivotal movement of the arms 130, 130, 130a, 130a, and the pivots 72, 72 and 131, 131 at each of the cover sections 8a, 8b. In FIG. 5 the arrows show the direction the various parts moved for placing the cover sections 8a, 8b in the closed position as shown.

Reference is now made to FIGS. 8 and 9, which show the cover locking mechanism 140, which is located inside of the covered vehicle; that is, the mechanism 140 has parts on the under or inside part of each respective cover section adjacent for connecting one cover section with the other. The cover locking mechanism 140 comprises an exterior tripping arm 141 that is angle shaped in two parts, 141a and 141b, the part 141b being rigidly attached to lever 142 (mounted on cover section plate 68b by journal 142a), the levers 141 and 142 forming a bell crank lever means pivoted about their juncture 143 mounted on cover section 8b and reacting in movement against bias spring means 144 mounted on section 8b. The arm 142 is pivotally connected with the link 145, which in turn is connected at 146a to a pivotal triangle-shaped bell crank lever 146 (on section 8b) which is pivoted at 147 about pivot means 147a (on section 8b), the said bell crank 146 having a pivotal connection 148 with adjustable arm 150 which is pivotally connected to lever 152 pivoted about pivot means 154 and pivotally connected to arm 156 having a slide portion 158 movably slidable in slide 160 and forming part of the movable block plate 162 that has an edge portion or corner part 164 in over-center locking relation with fixed locking plate 166. The locking plate 162 is connected with the cover section 8b, while the locking plate 166 is connected with cover section 8a. An adjusting assembly 170 is adjusted to take out slack or loose fitting due to wearing of the parts and has plate 172 which is an L-shaped arm entrapped between nuts 174 and 176 threadable on bolt 178, the L-shaped arm 172 being welded to J-shaped arm 180 which is frictionally engageable with J-shaped plate 182 which is held against the J-shaped plate 180 (attached to cover plate 8b) by U-shaped adjustment plate 184 adjusted by nuts 186 and 174 carried by the bolt 178. The bell crank structure 146 has a trip arm 188 which is tripped back to the solid line position (FIG. 8) by tripping arm 190 carried by the cover plate section 166, such that when the cover plate section 166 of part 8a is allowed to fall, its tripping arm 190 trips and returns the locking mechanism 140 to its original position (in the cover locked position) by engagement with the tripping arm 188. This operation is illustrated in FIG. 8 where the original position is shown in solid and the pre-trip position, or releasing position, is shown in dotted line. Also in FIG. 9 the arm 141 is shown in the solid line position or locked cover position and is also shown in the dotted line or cover releasing position which corresponds to the solid and dotted line positions of members 146 and 190 and 188 of FIG. 8. When the cover sections 8a and 8b are released by operation of mechanism 140 they fall by gravity to the sides of the car.

It is thus seen that this invention comprehends, among other things, the provision of a weather sealed overhead covered railway coil car with a continuous coil trough and having operating mechanism for operating the car's pivotally mounted but easily removable overhead covering means between open and closed positions, the car being constructed for easy lading accessibility and to accommodate various sized coils and wherein the car is designed to be protective of the cover means which is attached to the car and does not take up any floor space in the car. The car is also provided with cross members that are shaped to form a coil cradle about the coils and which cross members protect the cover sections of the cover means when swung in an arcuate path from closed to open positions with the car meeting the Association of American Railroads clearance diagram requirements as illustrated in dot-dash line RCD in FIGS. 3 and 4. The car cover sections may be closed by a crane and held in a locked position or released to an open position. The car is of light weight but strong construction, being provided with a fixed center sill and cushioned ribbon sill, with the center sill carrying arcuate cross members supporting lading protecting sheeting.

The foregoing description and drawings are given merely to explain and illustrate the invention and the invention is not to be limited thereto, since those skilled in the art may have the disclosure before them will be able to make modifications and variations therein without departing from the scope of the invention.

What is claimed is:

1. A covered lading carrying vehicle comprising a longitudinally extending body having a cross section of generally sector-like shape and defining a generally open trough portion for storing lading therein, a pair of longitudinally extending cover sections, each cover section being generally sector-like shaped in cross section and pivotally mounted to the ends of said body and positionable overhead thereof in closing engagement with one another to define a generally enlarged sector-like overhead closure means in forming a generally round-like cross section with the body, and cover operating mechanism mounted on said vehicle and operatively connected with each of the cover sections and the body and operative to move each cover section relative to the other in a generally curved path between a raised closed overhead position and lowered open down position, and releasable cover locking means comprising a tripping means for releasing the cover sections from one another mounted externally on one cover section and operating linkage connecting with the tripping means and mounted on the interior of the one cover section and including a sliding lock member in overlapping catching relation to the other cover section in preventing separation of the cover sections from one another in the locked position thereof.

2. A covered lading carrying vehicle comprising a longitudinally extending body having a cross section of generally sector-like shape and defining a generally open trough portion for storing lading therein. A pair of longitudinally extending cover sections, each cover section being generally sector-like shaped in cross section and pivotally mounted to the ends of said body and positionable overhead thereof in closing engagement with one another to define a generally enlarged sector-like overhead closure means in forming a generally round-like cross section with the body, and cover operating mechanism mounted on said vehicle and operatively connected with each of the cover sections and the body and operative to move each cover section relative to the other in a generally curved path between a raised closed overhead position and lowered open down position, and each cover section having a longitudinally extending overhead wall and lower, intermediate and upper longitudinally extending reinforcing tubular beam structures disposed on the inward face of the longitudinally extending overhead wall and a plurality of transversely extending longitudinally spaced support sections being connected with each of the tubular beam structures and with the overhead wall.

3. The invention according to claim 2 and the upper tubular beam structure of each cover section being complementary of the other in defining gathering means for cooperative coupling of the cover sections together.

4. A covered lading carrying vehicle comprising a longitudinally extending body having a cross section of generally sector-like shape and defining a generally open trough portion for storing lading therein, a pair of longitudinally extending cover sections, each cover section being generally sector-like shaped in cross section and pivotally mounted to the ends of said body and positionable overhead thereof in closing engagement with one another to define a generally enlarged sector-like overhead closure means in forming a generally round-like cross section with the body, and cover operating mechanisn mounted on said vehicle and operatively connected with each of the cover sections and the body and operative to move each cover section relative to the other in a generally curved path between a raised closed overhead position and lowered open down position, and said cover operating mechanism comprising an activated member, a lever means connecting with the activated member, a drive element connected with the lever means, a drive tube means disposed about and connected with the drive element and link means at each end of the cover sections and connecting the drive tube means with the cover sections.

5. A covered lading carrying vehicle comprising a longitudinally extending body having a cross section of generally sector-like shape and defining a generally open trough portion for storing lading therein, a pair of longitudinally extending cover sections, each cover section being generally sector-like shaped in cross section and pivotally mounted to the ends of said body and positionable overhead thereof in closing engagement with one another to define a generally enlarged sector-like overhead closure means in forming a generally round-like cross section with the body, and cover operating mechanism mounted on said vehicle and operatively connected with each of the cover sections and the body and operative to move each cover section relative to the other in a generally curved path between a raised closed overhead position and lowered open down position, and the body cross section comprising a pair of laterally opposed and spaced apart cross arm means, each cross arm means defining with the other the generally sector-like shape of the body and each cross arm having a respective cover section having a complementary bowed portion for reciprocal passage of the cover section from the overhead closed position to the lowered open position where said cover section is in juxtaposition with respect to the respective cross arm means and outwardly thereof with portions of the cover section not extending above its cross arm means in the lower open position of such cover section.

6. A covered lading carrying vehicle comprising a longitudinally extending body having a cross section of generally sector-like shape and defining a generally open trough portion for storing lading therein, a pair of longitudinally extending cover sections, each cover section being generally sector-like shaped in cross section and pivotally mounted to the ends of said body and positionable overhead thereof in closing engagement with one another to define a generally enlarged sector-like overhead closure means in forming a generally round-like cross section with the body, and cover operating mechanism mounted on said vehicle and operatively connected with each of the cover sections and the body and operative to move each cover section relative to the other in a generally curved path between a raised closed overhead position and lowered overhead position and lowered open down position, said body having an opposed cross arm means and each of said cover sections being movable about a respective cross arm means and having moving frictional engagement therewith, and roller means being provided between a respective cover section and a respective cross arm means for permitting moving frictional engagement between the cover section and the respective cross arm means.

7. A covered lading carrying vehicle comprising a longitudinally extending body having a cross section of generally sector-like shape and defining a generally open trough portion for storing lading therein, a pair of longitudinally extending cover sections, each cover section being generally sector-like shaped in cross section and pivotally mounted to the ends of said body and positionable overhead thereof in closing engagement with one another to define a generally enlarged sector-like overhead closure means in forming a generally round-like cross section with the body, and cover operating mechanism mounted on said vehicle and operatively connected with each of the cover sections and the body and operative to move each cover section relative to the other in a generally curved path between a raised closed overhead position and lowered open down position, and said cover operating mechanism comprising a driving element operatively disposed on the vehicle, and drive shaft means connecting with said driving element and drive tube means connecting with said drive shaft means and driven thereby and cover operating linkage pivotally connecting the drive tube means with each of the cover sections for bringing together and separating the cover sections with respect to each other.

8. The invention according to claim 7 wherein said driving element comprises a lifting eye which may be hooked by a crane or the like for operating said cover operating mechanism.

9. A lading carrying covered vehicle comprising a longitudinally extending body having a plurality of pairs of laterally opposed generally outwardly bowed cross arms spaced longitudinally of the car to define a skeletal framework, a center sill means running longitudinally of the body at the lower central portion thereof and being connected with each cross arm, a pair of laterally opposed longitudinally extending generally curved side walls disposed adjacent a respective cross arm to define therewith a generally sector-like body portion, cover means disposed in operatively selectable overhead covered position of the vehicle and being generally of sector-like shape in cross section and extending longitudinally of the vehicle and having end sections, said cover means having its lower portions disposable over and around the upper outer portions of the body in the overhead covered position and comprising a pair of generally sector-like cover sections, each cover section in the overhead covered position defining with the other said sector-like shaped cover means and comprising an overhead generally curved wall extending longitudinally of the car and a pair of longitudinally opposed end walls, each end wall being affixed to a respective end of the overhead wall.

10. The invention according to claim 9 and cover operating means coupled to the cover sections and the body for placing the cover sections from overhead closed position to down open position.

11. The invention according to claim 9 and said vehicle having end platform means carried by said center sill means.

12. The invention according to claim 11 and cover operating means operatively connecting the body with each cover section for opening and closing same.

13. A lading carrying vehicle comprising a longitudinally extending body of generally semi-round like cross section, said cross section being defined by laterally spaced apart outwardly bowed cross arm means, an under center sill running longitudinally of the body and connecting with said cross arm means, and side walls supported by said cross arm means, and end walls connecting with the side walls.

14. A lading carrying vehicle comprising a longitudinally extending body of generally sector-like cross section and having a plurality of longitudinally spaced pairs of laterally opposed and spaced apart outwardly bowed cross arms to define a car skeletal framework having opposed sides to cradle the lading, an under center sill running longitudinally of the body at the lower central portion thereof and being connected with the lower portion of each cross arm, a pair of laterally opposed longitudinally extending side walls being spaced above the center sill means and being inboardly adjacent respective longitudinally spaced lateral cross arms of one side to define with the other side and the center sill means, the generally sector-like body and end walls connecting with said side walls to form the ends of the body.

15. The invention according to claim 14 and cover means disposed in operatively selectable overhead position of the vehicle, said cover means being generally of sector-like shape in cross section and extending longitudinally of the vehicle and having end sections, said cover means having lower portions disposable over and around the upper outer portions of the body in the overhead position.

16. The invention according to claim 14 and cover means comprising a pair of generally sector-like cover sections, each cover section in the overhead covered position defining with the other said sector-like shaped cover means and comprising an overhead generally curved wall extending longitudinally of the car and a pair of longitudinally opposed end walls, each end wall being affixed to a respective end of the overhead wall.

17. Overhead cover means for a vehicle having an open top comprising a pair of longitudinally extending generally outwardly convex sector-like cover sections, one of each of the sections abutting one another in a closed overhead position, means pivotally connecting each cover section to the vehicle, and cover operating means for each cover section adapted for connection with the vehicle attendant to moving the cover sections between open down and closed overhead positions, and said cover operating means comprising a lifting element, a shaft connected with and rotated by the lifting element, a tube around and connected with the shaft and driven thereby, and linkage pivotally connecting with the tube and each cover section for swinging each cover section in an arcuate path from lowered open position to raised overhead closed position.

18. The invention according to claim 17 and comprising a crane operated arm means and linkage including a shaft means surrounded by a tubular means fixed to the shaft means and transmitting drive through connecting linkage to each of the cover sections for movement thereof in the arcuate path.

19. The invention according to claim 17 and cover locking means having an external trip and internal linkage including overlapping portions of each of said cover sections for release of one cover section from the other.

References Cited

UNITED STATES PATENTS

| | | | |
|---|---|---|---|
| 1,344,322 | 6/1920 | Walker | 105—377 |
| 2,795,539 | 6/1957 | Hughes | 105—377 |
| 3,008,759 | 11/1961 | Stiefel et al. | 105—377 |
| 3,169,492 | 2/1965 | Stiefel et al. | 105—377 |

FOREIGN PATENTS

| | | |
|---|---|---|
| 453,165 | 11/1927 | Germany. |
| 233,049 | 4/1964 | Germany. |

ARTHUR L. LA POINT, Primary Examiner

R. A. BERTSCH, Assistant Examiner